United States Patent
Richmond

(10) Patent No.: US 8,286,146 B2
(45) Date of Patent: *Oct. 9, 2012

(54) METHOD FOR AUTOMATIC GENERATION OF SCHEMA MAPPING APPLICATION CODE

(75) Inventor: Michael Richmond, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 1168 days.

This patent is subject to a terminal disclaimer.

(21) Appl. No.: 12/128,960

(22) Filed: May 29, 2008

(65) Prior Publication Data

US 2008/0229279 A1    Sep. 18, 2008

Related U.S. Application Data

(63) Continuation of application No. 11/615,097, filed on Dec. 22, 2006, now abandoned.

(51) Int. Cl.
G06F 9/44    (2006.01)
G06F 9/45    (2006.01)
G06F 7/00    (2006.01)
G06F 17/30   (2006.01)

(52) U.S. Cl. ........ 717/137; 717/106; 717/136; 707/802; 707/809

(58) Field of Classification Search .................. None
See application file for complete search history.

(56) References Cited

U.S. PATENT DOCUMENTS

| | | | |
|---|---|---|---|
| 6,985,912 B2 | 1/2006 | Mullins et al. | |
| 6,999,956 B2 | 2/2006 | Mullins | |
| 2004/0006549 A1 | 1/2004 | Mullins et al. | |
| 2005/0149484 A1* | 7/2005 | Fox et al. | 707/1 |
| 2006/0048107 A1* | 3/2006 | Thiagarajan et al. | 717/136 |
| 2006/0184568 A1 | 8/2006 | Barcia | |

* cited by examiner

Primary Examiner — Lewis A Bullock, Jr.
Assistant Examiner — Mark Gooray
(74) Attorney, Agent, or Firm — Cantor Colburn LLP; Brian Lambert

(57) ABSTRACT

A method for automatic generation of schema mapping application code. The method includes loading a code generation tool with source and target schemas. The method further includes defining the mapping specification between the source and the target. The method proceeds by triggering the code generation tool. Afterwards, the method proceeds by compiling the generated code. Furthermore, the method includes executing the generated code to transform input data files.

4 Claims, 1 Drawing Sheet

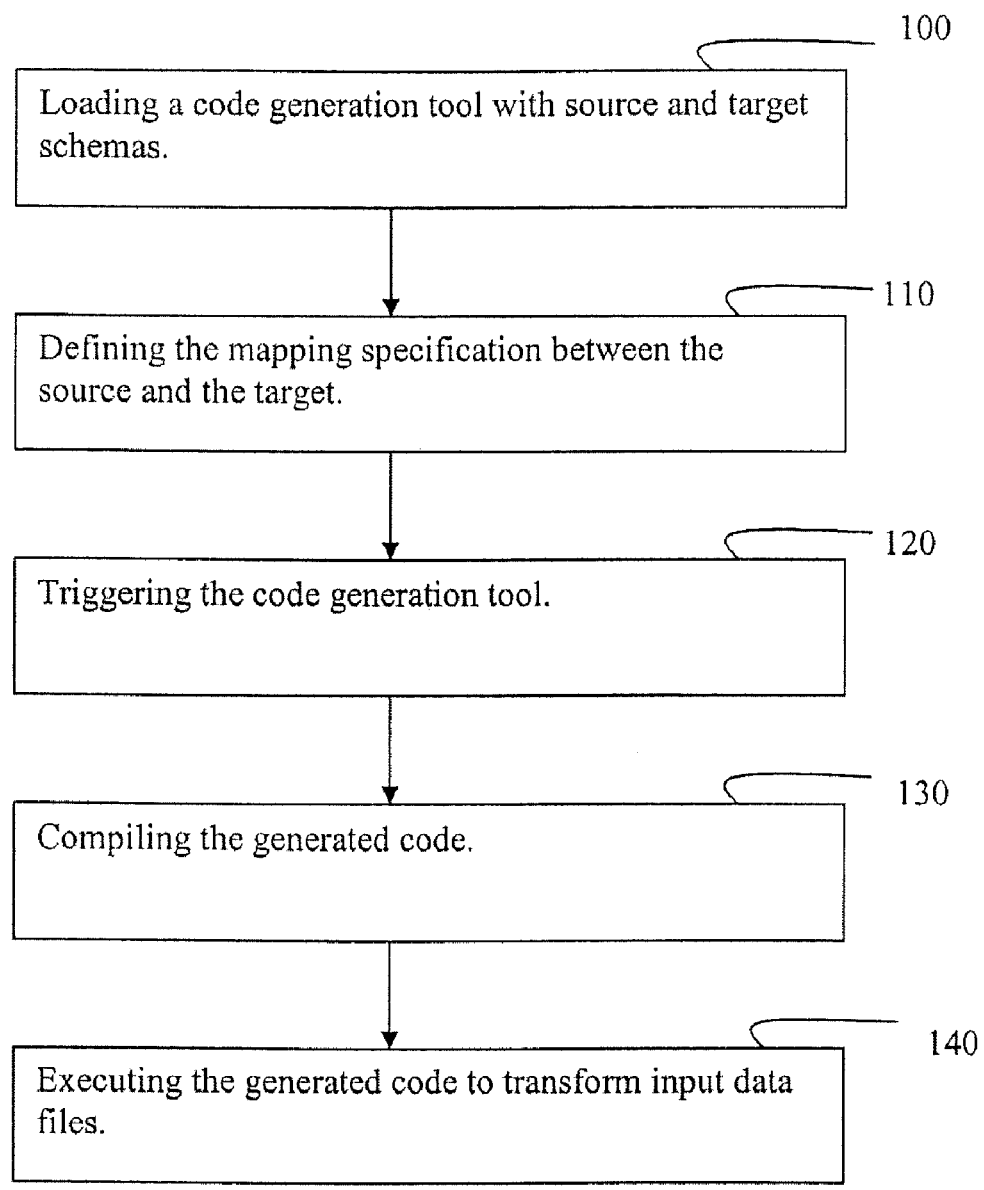

METHOD FOR AUTOMATIC GENERATION OF SCHEMA MAPPING APPLICATION CODE

CROSS REFERENCE TO RELATED APPLICATIONS

This application is a continuation of U.S. patent application Ser. No. 11/615,097 filed Dec. 22, 2006, the contents of which are incorporated by reference herein in their entirety.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of Invention

This invention relates in general to information systems, and more particularly to data exchange and data storage among information systems.

2. Description of Background

Modern information systems rely heavily on both data exchange and data storage. Data exchange enables interaction between different components in an information system. Additionally, data exchange makes it possible for an information system to interact with other information systems. Data exchange between information key feature of current enterprise systems.

Data storage is used extensively to handle the various data used by information systems. Information systems are increasingly attempting to share common data storage pools across organizations. In some cases data stores are being shared between organizations to support joint enterprise systems. Data storage is commonly used to integrate data from disparate systems to present a unified view of data that may originate from varying sources.

In order for data exchange and data storage to function all parties involved must agree on a common format and structure before direct data exchange or sharing via a data store can be accomplished. This format and structure information is known as the data schema. With both data exchange technology and data storage technology all data to be exchanged or stored must conform to a well-defined data schema in order for the information system to interpret the data.

In practice data schemas are defined by the target data store, the integrated data view or as a requirement on the data exchange process. The key requirement in all cases is that the data to be stored, integrated or exchanged and must conform to a shared data schema. That is, interaction between information systems relies upon both data producers and data consumers to agree upon the data schema to be used.

When these data interactions cross-organizational and administrative boundaries problems arise. These problems are based on the difficulty of managing a common definition and ensuring data compliance with the agreed upon data schema across the organizational and administrative boundaries. It is common for each party involved in a data interaction to have their own internal data schema. This internal schema is often influenced by factors that are completely unrelated to, and likely to take precedence over any data interaction requirements. Some factors that commonly influence internal schema designs include: the organization's existing internal data stores, internal application structures and behavior, business processes and needs, political and administrative structure of the organization, and software development constraints.

It is often possible to align an organization's internal data schemas with the schemas necessary to allow data interaction with other organizations. Organizations that need to perform data interactions with other parties generally invest significant development and maintenance effort to ensure that information systems conform to the agreed upon common data schemas. When these schemas evolve further effort to update, test and deploy schema-dependent portions of the information systems is necessary. As organizations increase the types of data interactions they are party to the required effort to maintain translation from the internal data schemas to the common data schema increases in direct proportion to the breath of the interactions.

To address these issues the concept known as schema mapping has been investigated within the following disclosure. For example, given two schemas, A and B, it is possible to define a mapping specification, which captures the correspondences between elements in schema A and elements in schema B. With this mapping information and an input document which conforms to schema A, it is possible to automatically produce an output document that corresponds to the input document data and conforms to schema B. Throughout this application, this process is referred to as executing the mapping. One skilled in the art should know that a mapping may involve a single source and a single schema, or alternatively a mapping may involve multiple sources and multiple schemas.

The disclosure pertains to a software tool, which automatically generates the source code for a custom application that executes a given mapping between schemas. That is, given a set of source and a set of target schemas together with a mapping specification that maps from the source schemas to the target schemas, the disclosed tool will generate the source code. This mapping application is able to read in input data documents that conform to the source schemas and produce output data documents that comprise the input document data in a form that corresponds to the target schemas based on the mapping specification. The disclosed invention may also be utilized to generate software artifacts other than applications, for example and not meant to be limiting, the disclosed invention may be utilized to generate software artifacts for a web service, or a software component, etc.

XML to XML mappings can be expressed as transforms over XML documents using query/script based techniques. For example, the mapping can be expressed as an XQuery or XSLT script that performs the specified mapping. Earlier work with the disclosed mapping tool automatically produced XQuery and XSLT transformation scripts based on an XML-to-XML map specification. Passing the transformation script along with an input data document into a script execution engine performs execution of these scripts over an XML data document. That is, passing the XQuery script into an XQuery execution engine along with the data document; or passing the XSLT scripts into an XSLT execution engine along with the data document.

A generic mapping engine could be used to address the problem described above. The generic mapping engine takes as input the source and target schemas, the map specification, and the data document to be transformed. Effectively a generic engine interprets the schemas and map specification at runtime to transform the input data document. Although practical, this kind of generic approach has two disadvantages when compared to the disclosed invention:

1. Increased complexity of the engine implementation, and

2. Longer execution times as a result of the indirection required to interpret the map specification at runtime.

The preliminary testing of the code generation approach versus a generic mapping engine show that the generated mapping application runs 45%-65% faster than a generic mapping engine over the same map specification and input document.

The generated applications are implemented in a person-friendly coding style making it easy for developers to understand, review and extend the generated code.

SUMMARY OF THE INVENTION

The shortcomings of the prior art are overcome and additional advantages are provided through the provision of a method for automatic generation of schema mapping application code. The method includes loading a code generation tool with source and target schemas. The method proceeds by defining the mapping specification between the source and the target schemas. Then, the method progresses by triggering the code generation tool. The method further includes compiling the generated code, and executing the generated code to transform input data files.

Additional features and advantages are realized through the techniques of the present invention. Other embodiments and aspects of the invention are described in detail herein and are considered a part of the claimed invention. For a better understanding of the invention with advantages and features, refer to the description and to the drawing.

TECHNICAL EFFECTS

As a result of the summarized invention, technically we have achieved a solution for a method for automatic generation of schema mapping application code.

BRIEF DESCRIPTION OF THE DRAWINGS

The subject regarded as the invention is particularly pointed out and distinctly claimed in the claims at the conclusion of the specification. The foregoing and other objects, features, and advantages of the invention are apparent from the following detailed description taken in conjunction with the accompanying drawing in which:

FIG. 1 illustrates one example of a method for automatic generation of schema mapping application code.

The detailed description explains an exemplary embodiment of the invention, together with advantages and features, by way of example with reference to the drawing.

DETAILED DESCRIPTION OF THE INVENTION

This application discloses a software tool that automatically generates the program code for a schema mapping application. The generated code includes a complete stand-alone application that can read in data files conforming to a specific source data schema and produce as output corresponding data files in which the input data has been transformed to conform to specific target data schemas. The user of this generation tool defines both the source and target schemas, and specifies the transformation from source to target to be performed. This transformation is known as the mapping specification. Based on this input, the tool invokes a series of code generators that produce source code that implements the desired schema mapping. It should be known by one skilled in the art that the disclosed invention might be utilized to produce source code in any programming language desired by the user. At generation time the user can select from a number of options that control various aspects of the code generation process. It should also be well known by one skilled in the art that a mapping may involve a single source and a single schema, or alternatively a mapping may involve multiple sources and multiple schemas.

In effect, the code generation tool performs a compilation of the mapping specification into a code implementation that performs the mapping defined by the mapping specification. In comparison, a generic mapping engine interprets the mapping specification at runtime to transform input data. Although this application illustrates the disclosed invention being utilized to generate software artifacts for an application, the disclosed invention may also be utilized to generate software artifacts for a web service, or a software component, etc.

Referring to FIG. 1, a method for automatic generation of schema mapping application code is shown. At step 100, a code generation tool is loaded with source and target schemas. Then, at step 110, the mapping specification is defined between the source and the target schemas.

Subsequently, at step 120, the code generation tool is triggered. Then, at step 130, the generated code is compiled. Afterwards, at step 140, the generated code is executed to transform input data files. The processing of FIG. 1 is described in further detail below.

The generated application code is designed to be easy for non-expert programmers to read and understand. As such, this approach makes it relatively easy for users to extend the generated application to perform data validation, specialized transformation functions and/or integrate the generated code into existing user applications.

The code generation tool generates a stand-alone application that performs the specified map transformation from input data documents to produce the output data documents. The structure of this application consists of a number of static library classes and a number of dynamic classes. The implementation of the static library classes is fixed and does not depend on the schemas or map specification for any particular generated application. As such, these static classes can be compiled and shipped as part of the tooling distribution although the code generation tool also supports the generation of these classes. The implementation and number of the dynamic classes is dependent on the schemas and particular map specification that the code generation tool will generate a custom application to implement. The static library classes are primarily interfaces and abstract classes that will be used as super-classes by the dynamic class in the custom application.

The dynamic classes can be divided into two groups. The first group consists of the dynamic classes for which the code generation tool is invoked once to produce a single version of these classes in the resulting generated application. Classes in this group are referred to as the singleton dynamic classes. The second group consists of the dynamic classes for which the code generation tool is invoked multiple times to produce several versions of these classes in the resulting generated application. Classes in this group are referred to as the map-specific dynamic classes.

The code generation tool reads in the source and target schemas along with the mapping specification and constructs data structures in memory to represent the schemas and the mapping specification. These in memory structures are referred to as the map specification data structures.

The code generation process is coordinated by a generation coordinator object (GCO). The GCO object handles the generation of the application code in two phases:

1. Extraction of data to produce generation arguments, and
2. Invocation of individual code generators.

First, the GCO traverses the map specification data structures and extracts information from the map specification structures to build up a set of generation arguments (GA). These generation arguments are tied to the particular code generators involved in producing the desired product. The resulting set of generation arguments holds only the data values that are required during code generation. These values are stored in a form that is convenient for authors of the code generators. By extracting only the information that is relevant to the code generation the authors of the code generators can focus on the task of producing the relevant output code rather than on where the information that controls the output code is located. At the end of this stage there is no further need for the GCO to access the map specification data structures and generation can complete based solely on the data represented in the GA objects. The generation of the GA objects is a structuring mechanism to reduce the complexity of the code generators. It is possible to eliminate this extraction phase if the code generation tool author is willing to deal with the resulting increase in complexity of the code generator implementation.

A code generator exists for each type of class that is generated by the application generation tool. That is, one code generator exists for each:
- singleton dynamic class,
- map-specific dynamic class forms (i.e. One generator for the target.java map-specific dynamic class. This generator is invoked multiple times with different arguments to produce the set of class used to represent the target schema.),
- static library class, and
- the ant build script The GCO invokes each of the generators in turn based on the extracted GA objects and user input. The user input is collected by an on-screen dialog before code generation commences. This dialog allows the user to specify the destination directory for the generated files and provides checkboxes to enable or disable the invocation of various categories of code generators. For example, one checkbox allows the user to specify that the static library classes should be generated, another checkbox controls whether the map-specific dynamic classes used to represent the target schema should be generated.

Invocation of a generator involves performing the following steps:
1. Instantiation of the appropriate code generator class.
2. Invocation of the appropriate generate ( . . . ) method passing the appropriate GA objects as arguments.
3. Parsing the string result from the generate ( . . . ) call to extract the package name and class name from the string containing the source code for the generated class.
4. Writing the string result from the generate ( . . . ) call to a file following source file naming conventions based on the extracted package and class names.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for automatic generation of schema mapping application code, including:
   loading a code generation tool with source and target schemas, wherein the code generation tool is triggered by selecting a code generation menu item, the code generation menu allowing the user to control aspects of the code generation process including:
      specifying a file system directory where generated files will be saved,
      turning off generation of particular application implementation files,
      defining the mapping specification between the source and the target, and
      customizing the generated application by incorporating the generated code into the existing application of the user;
      wherein the code generation tool is configured to generate at least, one of, (i) a stand- alone application, (ii) a web service implementation, and (iii) a software component for performing the specified map transformation from input data documents to produce the output data documents;
   triggering the code generation tool, wherein the code generation tool is configured to generate an application for generating code for performing the specified map transformation from input data documents to produce the output data documents;
   wherein the application includes a plurality of static library classes and a plurality of dynamic classes, the implementation of the static library classes being fixed and not dependent upon the source or target schema and map specification for any particular generated application, the implementation and quantity of the dynamic classes being dependent upon the source and target schemas and the map specification that the code generation tool generates;
   wherein the dynamic classes are separated into two groups, (a) the first group termed the singleton dynamic classes, the first group being dynamic classes for which the code generation tool is invoked once to produce a single version of these classes and, (b) the second group termed the map-specific dynamic classes, the second group being the dynamic classes for which the code generation tool is invoked multiple times to produce various versions of these classes;
   compiling the code generated by the code generation tool; and
   executing the code generated by the code generation tool to transform input data files.

2. The method of claim 1, wherein the code generation tool is configured to read in the source and target schemas along with the mapping specification and construct data structures in memory to represent the schemas and the mapping specification.

3. The method of claim 2, wherein the code generation process is coordinated by a generation coordinator object (GCO), the GCO handles the generation of the application code in two phases, (i) extraction of data to produce generation arguments, and (ii) invocation of individual code generators.

4. A method for automatic generation of schema mapping application code, including:
 loading a code generation tool with source and target schemas, wherein the code generation tool is triggered by selecting a code generation menu item, the code generation menu allowing the user to control aspects of the code generation process including:
  specifying a file system directory where generated files will be saved,
  turning off generation of particular application implementation files,
  defining the mapping specification between the source and the target, and
  customizing the generated application by incorporating the generated code into the existing application of the user;
 triggering the code generation tool, wherein the code generation tool is configured to generate an application for generating code for performing the specified map transformation from input data documents to produce the output data documents;
 wherein the application includes a plurality of static library classes and a plurality of dynamic classes, the implementation of the static library classes being fixed and not dependent upon the source or target schema and map specification for any particular generated application, the implementation and quantity of the dynamic classes being dependent upon the source and target schemas and the map specification that the code generation tool generates;
 wherein the dynamic classes are separated into two groups, (a) the first group termed the singleton dynamic classes, the first group being dynamic classes for which the code generation tool is invoked once to produce a single version of these classes and, (b) the second group termed the map-specific dynamic classes, the second group being the dynamic classes for which the code generation tool is invoked multiple times to produce various versions of these classes;
 wherein the code generation tool is coordinated by a generation coordinator object (GCO), the GCO handles the generation of the application code in two phases, (i) extraction of data to produce generation arguments, and (ii) invocation of individual code generators tied to the generation arguments, wherein one code generator exists for each static library class and each dynamic class used by the code generation tool;
 compiling the code generated by the code generation tool; and
 executing the code generated by the code generation tool to transform input data files.

\* \* \* \* \*